US006775591B1

(12) United States Patent
Shoenfeld

(10) Patent No.: US 6,775,591 B1
(45) Date of Patent: Aug. 10, 2004

(54) PORTABLE MEDICATION DISPENSING UNIT

(75) Inventor: Norman A. Shoenfeld, Livingston, NJ (US)

(73) Assignee: S&S X-Ray Products, Inc., Pen Argyl, PA (US)

( * ) Notice: Subject to any disclaimer, the term of this patent is extended or adjusted under 35 U.S.C. 154(b) by 0 days.

(21) Appl. No.: 10/350,946

(22) Filed: Jan. 24, 2003

(51) Int. Cl.[7] ................................................ G06F 17/00

(52) U.S. Cl. ....................... 700/243; 700/225; 700/237; 700/242; 221/76; 221/121; 221/122

(58) Field of Search ................................ 700/243, 213, 700/214, 225, 237, 242; 312/97, 97.1, 266, 267, 268; 221/76, 77, 119, 121, 122

(56) References Cited

U.S. PATENT DOCUMENTS

| | | | | | |
|---|---|---|---|---|---|
| 3,464,750 | A | * | 9/1969 | Anders | 312/268 |
| 3,883,203 | A | * | 5/1975 | Lexe | 312/268 |
| 4,813,752 | A | | 3/1989 | Schindler | 312/268 |
| 5,431,299 | A | * | 7/1995 | Brewer et al. | 221/2 |
| 5,438,523 | A | * | 8/1995 | Humm et al. | 700/243 |
| 5,820,237 | A | * | 10/1998 | Robey | 312/268 |
| 6,170,929 | B1 | | 1/2001 | Wilson et al. | 312/268 |

* cited by examiner

*Primary Examiner*—Khoi H. Tran
(74) *Attorney, Agent, or Firm*—Bernhard P. Molldrem, Jr.

(57) ABSTRACT

A medication dispensing cart has a pull-out drawer, and a conveyor that transports a number of removable medication bins within the cart, one at a time, to the position of the drawer. An on-board processor controls operation of the bin conveyor mechanism whose pathway can be a serpentine (folded) loop. The drawer slide engages the bin located at the drawer position, and the bin can be pulled forward from said conveyor and pushed back onto the conveyor. The bins can be lifted out when the drawer is opened. A 2-D bar code symbol or other machine-readable code, positioned on the bin, contains data identifying the contents of the bin and the associated patient. A reader device reads the coded symbol and transfers data for that bin to an on-board processor. The processor keeps track of the bins on the conveyor, as well as their contents. Pusher arms on the drawer assist in pushing the bin out when the drawer is opened and in returning the bin onto its carrier when the drawer is closed. The arms are rocked out of contact with the associated bin when the drawer is in a fully closed position. The processor provides a record for accountability of access to the bins. An alternative arrangement can be seven feet in height with the drawer access at waist level, and with a pull-out work shelf.

18 Claims, 9 Drawing Sheets

FIG.11A
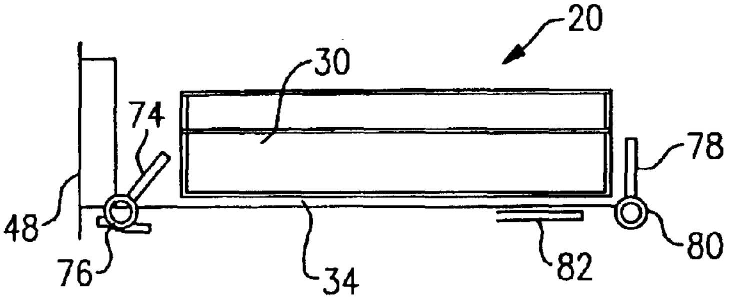
FIG.11B
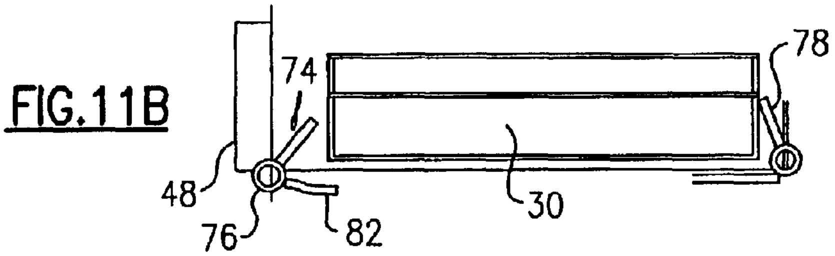
FIG.11C
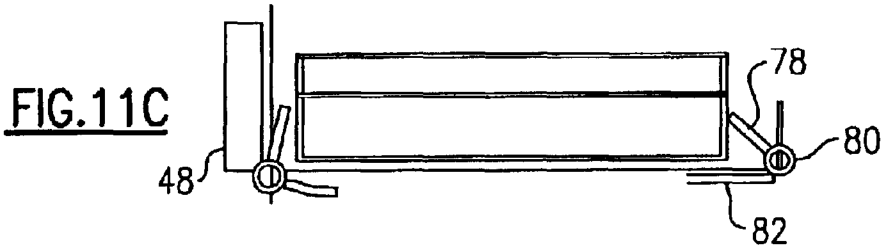
FIG.11D
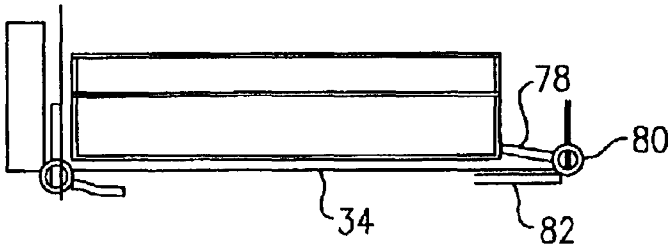
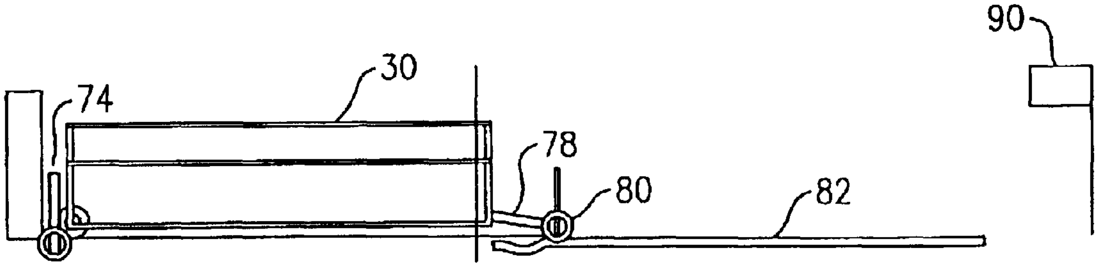
FIG.11E

PORTABLE MEDICATION DISPENSING UNIT

BACKGROUND OF THE INVENTION

This invention relates to devices and techniques for dispensing medication and/or other treatment materials to hospital patients, and is especially directed to a medication dispensing cart which provides a nurse or other health care practitioner with access to each patient's medication in a bin that has been previously prepared and filled for that purpose in a pharmacy facility.

Medication carts for distributing patient prescription drugs and other medication and treatment materials to hospital patients can be employed in hospitals, clinics, nursing homes and other health care facilities. In a typical design, the cart has a number of individual drawers, each with the medication for a respective hospital patient at a given hospital ward or floor. These carts are typically filled in the pharmacy department with the patients' medicine, and then wheeled to the floor or ward. The typical medication cart can facilitate distribution of the medicine somewhat, but there remains a need to account for who may have access to a given patient's medication and when such access occurred. This can be important in the case when a medication, e.g., digitalis in the case of heart patients, had to be "borrowed" from one patient's drawer for the emergency use by another patient, thus leaving a deficit of that drug for the first patient. It is also important to ensure that the medication prescribed for a given patient reaches that patient and is not mistakenly administered to the wrong patient.

One proposal for a medicine cart with access limited to one drawer at a time is described in U.S. Pat. No. 6,170,929. In that cart, there are a number of individual trays that are carried on a conveyor inside the housing of the cart, and these can only be accessed, one tray at a time, at one position at the top of the cart, where there are locking access doors. A microprocessor controls the movement of the conveyor in response to a hand-held computer that is carried by the nurse. This particular cart does have significant limitations in that its bins are not removable, so they cannot be removed to take to the patient's room for administration of the medicine, nor can the bins be pre-loaded at pharmacy and simply inserted into the cart. The need to load the cart by hand leaves room for human error in placing the drugs, syringes, bandages or other medication into the individual bins on the cart, as well as in the need for manual entry of patient and medication information into the unit.

It was desired to have a medical cart or similar medical dispensing station that facilitates pre-loading the patient medication bins by the pharmacist, and which minimizes the opportunity for human error when the medications are dispensed.

It is also desired to have the medical cart automatically bring the various bins up to a dispensing location on the cart one at a time, and to have an automatic bin-centering feature so that the bins do not collide with internal hardware inside the cart cabinet when the bins are being transported on the conveyor inside the cart.

OBJECTS AND SUMMARY OF THE INVENTION

Accordingly, it is an object of the present invention to provide a medical dispensing cart or equivalent dispensing station that avoids the drawbacks of the prior art.

It is another object to provide a medical cart that facilitates administration of medication to each of the patients in a given hospital ward or floor, with a minimum of complexity and without opportunity for human error.

It is still another object to provide a medical cart that can be easily loaded using patient medicine bins that have been pre-loaded at a pharmacy for the respective patients, and which can automatically transfer data concerning the contents of the bin and the identity of the patient for that bin to the data processor of the cart.

In accordance with an aspect of the present invention, an automated medication dispensing cart, has a cabinet or enclosure with a flat top surface work surface. There is at least one drawer opening in the front wall of the cabinet at a drawer position near the top of the cabinet. An on-board processor stores data concerning the contents of the various medicine bins inside the cart and controls operation of the bin conveyor mechanism. The processor includes display means and a keyboard, active screen, or other user access means to permit the user to enter information about the patient so that the user, to wit, a nurse, can access the patient's medication within the dispensing cart. Within the cart there are a plurality of elongated medication bins, e.g., 24 to 35 bins, and internal conveyor means within cart cabinet or enclosure that support the bins and moves them, under control of the processor, along a predetermined pathway inside said cabinet. This can be a serpentine (folded) pathway so as to maximize the number of bins contained in the cart. There is a drawer position on this pathway aligned with drawer opening, and a drawer is located at this drawer position. Here, a slide member engages a respective one of the bins that happens to be located at the drawer position, and permits the user to pull the bin out from said conveyor means and to pushed it back in to return the bin to the conveyor means. The internal conveyor means includes a plurality of bin carriers that are spaced apart at intervals on the conveyor means, and which are transported along the folded pathway. Each of the bin carriers has structure that slidably mates with corresponding structure on the bins, so that the bins are supported on the conveyor means as they travel along the pathway but are permitted to slide out from the respective bin carriers when at the drawer position.

Preferably, each of the bins can be removed from the cabinet when the bin is at the drawer position with the drawer slide pulled out. The bin can be removed and put back into the drawer later or can be replaced with another bin from the pharmacy. In each case a coded device, that is a 2-D bar code symbol or other coded visual, RF, or magnetic symbol (i.e., a machine-readable code) is positioned on the bin, with the coded symbol containing data representing the contents of the bin and associated patient identification information. The cart includes a reader device at the drawer position for reading the coded symbol and for transferring data for each respective bin to the on-board processor, so that the processor can keep track of which bin is which on the conveyor, as well as what the contents arc for the bins. This facilitates accountability for the medications in the cart, and also makes it possible for a patient's medication to be "borrowed" on an emergency basis, while at the same time the processor will note a shortage of the bin from which the medication had been borrowed so it can be replaced. The processor facility that permits borrowing can be enabled, limited, or blocked, at the option of a supervisory authority.

The bins can be loaded in an order that is determined by an algorithm so as to minimize the times for the bins to reach the access drawer position.

Preferably, the bins are configured to be removable from the drawer when in the drawer is opened. This can facilitate taking the bin directly to the patient with the set of medications for that patient. In a preferred embodiment, each the bin carriers has a pair of horizontal flanges facing one another along opposite sides of the carrier, and each said bin has a pair of elongated channels on opposite sides to slide onto the carrier flanges. This allows the bin to be held securely while traveling on the conveyor inside the enclosure, but also allows the bin to slide out for removal and replacement.

The conveyor pathway is preferably a closed, serpentine loop. The conveyor includes a drive web, e.g., a chain or belt traveling over wheels or pulleys that define the closed loop and the bin carriers are affixed onto this drive web. A gear drive motor drive propels the drive web, with the gear motor drive preferably being a 90-degree gear motor disposed at a back wall of the enclosure. This arrangement is remarkably compact. The gear motor drive includes a worm gear that prevents the conveyor from being advanced by hand when the drawer is pulled out, so only the one bin can be accessed at a time.

The serpentine pathway can leave space in the cabinet for an auxiliary drawer situated at or near the top, and which can be adjacent the removable-bin drawer. This contains an auxiliary (fixed) bin that does not travel along pathway, with the serpentine pathway bypassing the auxiliary drawer position.

In a preferred mode, the drawer slide includes a rear pusher arm at a distal end of the slide behind said the position of the bin carrier, and this rear arm is rotated by cam action to contact and push out the associated bin when the drawer is pulled out. There is also a front pusher arm at a proximal end of the slide in advance of the carrier and this front arm is also rotated by cam action to contact and push the associated bin back onto the carrier when the drawer is pushed back in. Both the rear and front arms are rocked out of contact with the associated bin when the drawer is in a fully closed position. There are front and rear cams operatively coupled to the front and rear arms, respectively, and a cam track affixed in the enclosure at the drawer position. The first and second cams respectively ride on this cam track when the drawer is pulled out and pushed in.

The web may be one or more continuous chains or alternatively one or more continuous belts of a durable synthetic material, such as polyethylene, polypropylene, vinyl, reinforced vinyl, Tyvek, or another suitable material.

The cabinet or enclosure preferably has casters or wheels to permit it to be pushed to desired locations on the floor or hospital ward. This can have other auxiliary features such as a lamp or light to facilitate reading of the prescription information for the patients or in completing the patient charts, and may have one or more built in IV pole. A waste container may also be incorporated. It is also possible to include a dispenser for towels, bandages, or other disposable materials.

The cart can be returned to the pharmacy for reloading after the medications are dispensed. Alternatively, a separate cart can be used for carrying pre-loaded bins to the hospital floor or ward, and a pharmacist can transfer the bins from the transport cart into the medication cart at the floor or ward. The pre-loaded bins can each have an identifying 2-D bar code symbol or other data-carrying symbol on it, which is automatically read when the bin is loaded into the medication cart, so that the cart's internal processor can track the contents and location of each bin, as well as the identification of the patient that the medicine is intended for.

The on-board processor stores the patient and medication information for each bin, and also tracks the identification of the person accessing each bin. This provides a positive means of accounting for the administration of each medication.

In the preferred medication cart there are twenty-four removable bins or drawer compartments, which move along a conveyor that is formed of a parallel configuration of multiple pulleys and roller chains. On the drive chain(s), at spaced regular intervals, are bin carriers that are supported on bins that extend out from the chains. Access to any particular drawer bin is through a single electronically locked door or panel near the top of the front wall of the cabinet. When a doctor, nurse, or other authorized user needs access to a drawer containing the patient's medication, the user provides his name or password and identifies the patient by name or room number. The conveyor system then moves the associated medication bin to the access point, i.e., drawer position, and releases the lock on the access mechanism, so that the authorized user can pull out the drawer slide and access this one bin only. At the time that the bin is accessed, the 2-D bar code that has been placed by the pharmacy department on the distal or back end of the drawer bin, is read by a scanner at that position, and the patient and bin content information is presented on the LCD screen of the on-board processor. This permits the authorized user to confirm that the bin is intended for that patient, and lists the contents of the bin on the screen. After the bin is replaced and the access drawer is closed, another drawer can be selected as desired, and the conveyor will bring the next desired bin to the access point or drawer position, and the access door is unlocked.

Preferably, the processor determines the shortest path to the next bin, and moves the conveyor in one direction or the other (forward or reverse) to reach the drawer bin in the shortest time. If the drawer is not immediately accessed, the access door can be automatically locked after a user-defined time period (e.g., 10 seconds). An audit trail is kept in the processor memory to identify who had access to any given drawer bin, and at what time access was made or attempted. This can be displayed on the LCD display or can be downloaded.

Preferably, the medicine bins are loaded in patient order, room order, or bed order, so as to minimize the time between stations on the conveyor, but this is not always necessary, and the bins can be loaded in other ways to optimize utilization.

The conveyor path is designed to maximize the number of drawer bins for the available volume inside the cart enclosure. The serpentine path also permits there to be a fixed drawer, preferably positioned at the top of the front wall next to the drawer for the removable bins. This drawer can be omitted to further increase the number of removable bins. This drawer can be employed either for larger bottles of multiple dose medication, such as a floor stock of liquid potassium, intended to be dispensed to many patients on the same floor or ward. The fixed drawer may also be used as a narcotic drawer, and require the input of an additional, secondary password or security code. A predetermined one (or more) of the removable bins can also be designated a narcotic bin and may require a special access code.

The conveyor track in this embodiment accommodates rather long pull-out bins, so the bins can be larger and longer than with other cart configurations. This allows the storage of larger bottles or containers of multiple dose medications.

The conveyor drive is a DC right-angle gearmotor, with a worm drive that prevents movement of the conveyor by manual pushing on a bin when the access door is open. The cart can be AC powered with battery backup, may be entirely AC powered, or may be entirely battery powered with plug-in recharging.

The cart can have an access mode for use when dispensing the medications to patients and also a loading or "pharmacy" mode. In the latter mode, input of a single password only is required for unlimited access to every bin in the cart.

Upon loading of the removable drawer bins in the pharmacy, the bar codes or other readable indicia are automatically read for each bin at the drawer position when the bin is inserted. The barcode scanner reads each bar code symbol when the cart is loaded in the pharmacy mode, and the patient and medication data contained in the symbol are stored in a database on the on-board processor. These data are at the same lime displayed on the LCD screen for verification that the proper patient drawer bin has been inserted into the cart. Later upon accessing the drawer in the access mode, the reader again reads the bar code symbol on the back of the bin when it reaches the drawer position, and the information therein is displayed on the LCD screen. The data base can be queried for access for the location of a certain medication, and the drawer bin containing this medication can be identified and accessed by an authorized user. This feature permits the nurse or other practitioner to "borrow" a medication for a patient on the nursing unit who needs a medication not present in his or her own drawer bin, this feature permitting the nurse to "borrow" the medication from another patient. The on-board processor can track the shortfall that results from this emergency borrowing, so that pharmacy can be contacted before the intended patient needs that drug or medicine. It is possible to communicate wirelessly with the pharmacy to alert them when such borrowing occurs, so a replacement medication can be sent up. The functionality that permits "borrowing" can be enabled, blocked, or limited, in accordance with hospital policy.

In a preferred configuration, the top of the cart has a generally flat ABS plastic work surface, with the touch screen LCD display situated in one corner. The bin access door and drawer slide are located at the upper left corner of the front wall, and the fixed drawer is located at the upper right corner.

The cart of this invention has the advantages of providing access in any drawer bin from the front of the cart without the nurse needing to stoop or bend. There is regulated access to one removable drawer bin at a time. Any of the bins can be given limited access based on user permissions. There can be multiple specific-access user identifications in addition to global access pharmacy identifications. The cart maintains an audit trail of all persons who accessed each drawer bin, including what persons had access, which drawer bins were accessed, and the time and date thereof. The audit trail may also include a list of medications removed at the time of drawer access. This list of medications may come from user input on the touch screen display, or from using the bar code scanner to identify these medications when removed. The drawer bins can be loaded on site, or can be loaded remotely (at pharmacy) and brought to the cart for loading. As each bin is accessed, the contents and patient identification are checked against the contents of the associated bar coded symbol and are displayed on the LCD screen.

With the bar code (or other coded symbol) capability, bar coded symbols or other readable indicia are placed on the individual drawer bin by the pharmacy department and are automatically read into the memory of the on-board processor when the bin is placed into the cart When the drawer bin is moved to the drawer position for access, the reader device again scans the patient and medication data provided for that bin, and this information is displayed on the LCD screen. This gives an additional check, and permits the floor or ward nurse to scan the names for the entire cart inventory, so as to make sure the correct medication bins have been installed in the cart. This also permits the nurse to scan medications for the entire cart to obtain "borrow" medication from a different patient drawer bin in urgent situations.

The cart can also be used for dispensing multiple medications (i.e., non-patient-specific items), bandages, salves, etc., in some of the bins, and in this case the bins can have internal dividers also. It is also within the scope of this invention for some of the bins to be non-removable with others being removable.

The on-board processor can be connected via an available computer cable to another computer for downloading audit trail information, or for uploading access and ID codes.

The cart of this invention allows access to only one removable drawer bin at a time, and provides access to each of the twenty-four drawers from a single pull out drawer at the top front of the cart.

The cart is preferably supported on casters so that it can be moved by the staff from room to room, and so that it can be taken to the pharmacy for reloading. However, it is entirely within the broad principles of this invention to provide a non-movable medicine dispensing cabinet that remains at a fixed station on the hospital floor.

An alternative embodiment can have an enclosure that extends upward, e.g., to a height of seven feet or more, with the drawer located at a position about three feet above the base of the enclosure. This may be provided with or without casters, and can contain twice the number of removable bins as in the first embodiment, e.g., ninety bins. Here, because the top is too high for use as a writing surface, a pull-out shelf can be provided adjacent to the drawer, i.e., just below it. The serpentine conveyor path extends both above and below the drawer position. A fixed drawer may optionally be included as well. Many other configurations can also be provided, i.e., double width, or having two or more fixed drawers.

The above and many other objects, features, and advantages of this invention will become apparent from the ensuing description of a selected preferred embodiment, which is to be considered in connection with the accompanying Drawing.

BRIEF DESCRIPTION OF THE DRAWING

FIGS. 11A to 11E show the action of the rear pusher arm in this embodiment.

DETAILED DESCRIPTION OF THE PREFERRED EMBODIMENT

Figure 1:
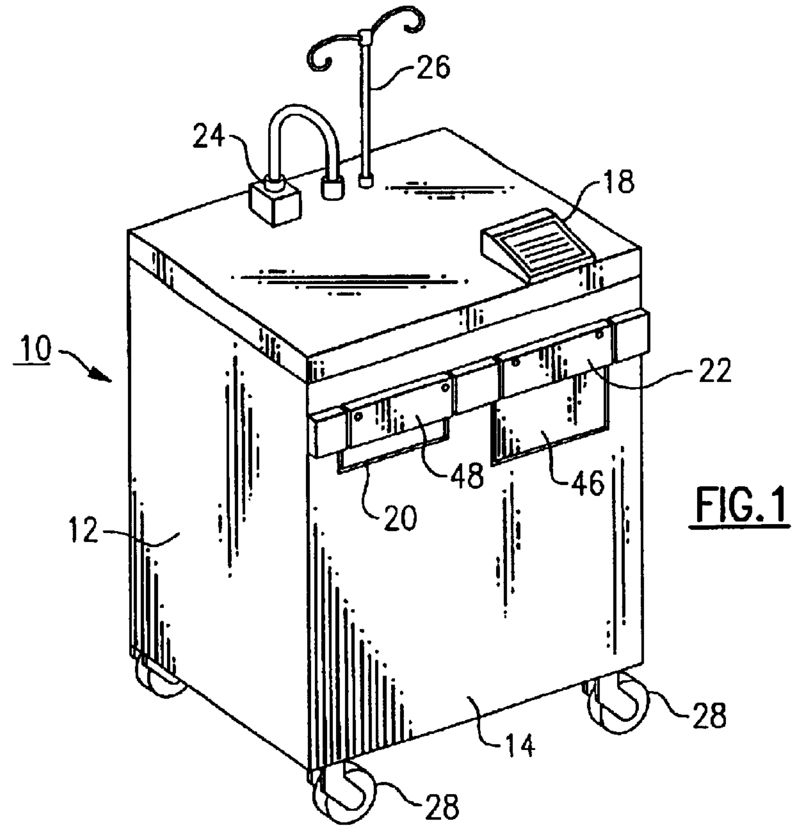
FIG. 1 is a perspective view of a portable medication dispensing cart according to one preferred embodiment of this invention.
Figure 2:
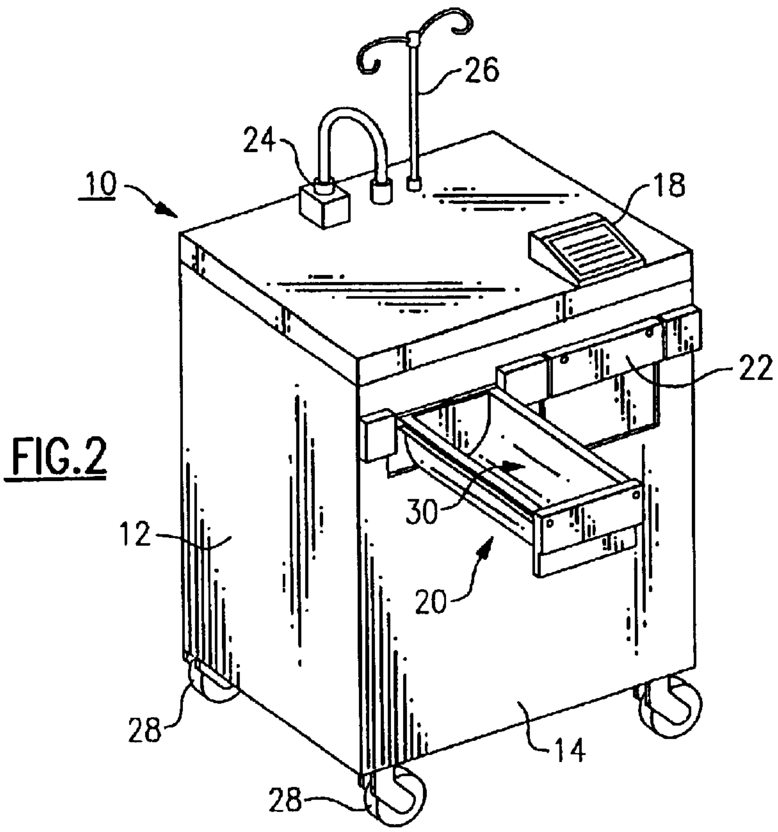
FIG. 2 is a similar perspective view of this embodiment, showing the bin drawer in an open, pulled-out position.

With reference to the Drawing, and initially to FIGS. 1 and 2, a medicine dispensing cart 10 is configured to permit a hospital or clinic worker, i.e., a nurse, doctor, or other hospital professional, to obtain medicine or other care materials for each of a group of patients, where the medicine has been pre-loaded in the cart according to the patients' prescriptions. The cart 10 has a cabinet or enclosure 12 formed of a front panel 14 and a top 16, as well as back, bottom and side walls. The top 16 has a touch-screen display 18 that is associated with an internal on-board computer processor, here situated just below the display. At the top left of the front panel 14 is a load-dispense port or drawer 20 where the authorized user can obtain the medications for each given patient, and to the right of this is a fixed bin drawer or port 22. In this embodiment, the drawer 20 pulls out, as shown in FIG. 2, for loading and for access to a particular patient's medication bin. The drawer 20 is electrically locked and unlocked, and when unlocked it may be manually opened and closed. Alternatively, the drawer 20 may have a motorized mechanism to open and close it when the desired bin is located there. The touch screen panel 18 permits customer entry of customer identity, PINs or access codes, and identification of the patient, room or bed, as appropriate. Alternatively, a keypad, card reader, badge reader, or other data entry mechanism can be used for access to the drawer 20.

The fixed drawer 22, which is separate from the sequential bins that are accessed from the drawer 20, is situated to the right of the drawer 20. The fixed drawer 22 can be used for medicines that are to be administered generally to several patients, or may be used as a special security drawer, e.g., for narcotic medications. The top 16 has a generally flat work surface, which may be used for writing, to update patient charts or to annotate other records. A lamp 24 is provided at the top 16, and an IV rod or pole 26 is provided at the rear of the cart 10 to assist in administering fluids intravenously to a patient. There are also casters 28 at the base of the enclosure 12, disposed one at each corner, to permit the cart 10 to be rolled from room to room at the hospital floor, and for rolling the cart 10 to pharmacy for reloading. In some embodiments, other means could be provided to support the enclosure 12.

With reference to FIGS. 3, 4, 5, and 6, within the enclosure there are a plurality of bins 30, each supported on a bin carrier or banger 32, and the bins and carriers are moved to place them, one at a time, at the position of the bin drawer 20. The drawer 20 has a drawer slide 34 for bringing the bin 30 out of the enclosure for access to the patients' prescription materials.

Within the enclosure, there is a serpentine conveyor system 36 on which the twenty-four bins 30 are carried on a folded pathway that extends vertically along the left side of the machine, and then horizontally back and forth, bypassing the position of the fixed drawer 22.

The conveyor system has front and rear drive chains 38 between which each of the bin carriers 32 is suspended, and these chains travel over respective front and rear sets of pulleys 40. A right angle gear motor drive 42 is situated at the rear within the enclosure 12 for driving the two drive chains 38. Because its motor is situated at a right angle to the output shaft, this gear motor 42 occupies only a small amount of space in the fore-to-aft direction. Also, the drive head of the gear motor 42 is preferably a worm gear drive, in which case the chain drive is held in position any time the motor portion thereof is not turning, so the drive chains 38 cannot be pushed by hand. This precludes a user from accessing a second bin simply by reaching in and pulling or pushing the drive mechanism.

The second or fixed drawer 22 has a slide 44 that permits the drawer to slide out when a front door panel 46 thereof is opened. The door panel 46 may be unlocked for access with a mechanical key or may be opened electronically with by entry of an access code.

The bin drawer 20 also has a front panel 48 that locks, and in this case its lock is electrical so the drawer is opened by the user entering an access code. This access code can be different for different bins 30, or for different categories of bins. The drawer then slides open when pulled out, and the bin 30 that is at the drawer location can be accessed and lifted out. When the medicines in that bin have been taken out of the bin for administration to the patient, the bin can be replaced into the drawer and the latter can be pushed shut.

Figure 7:
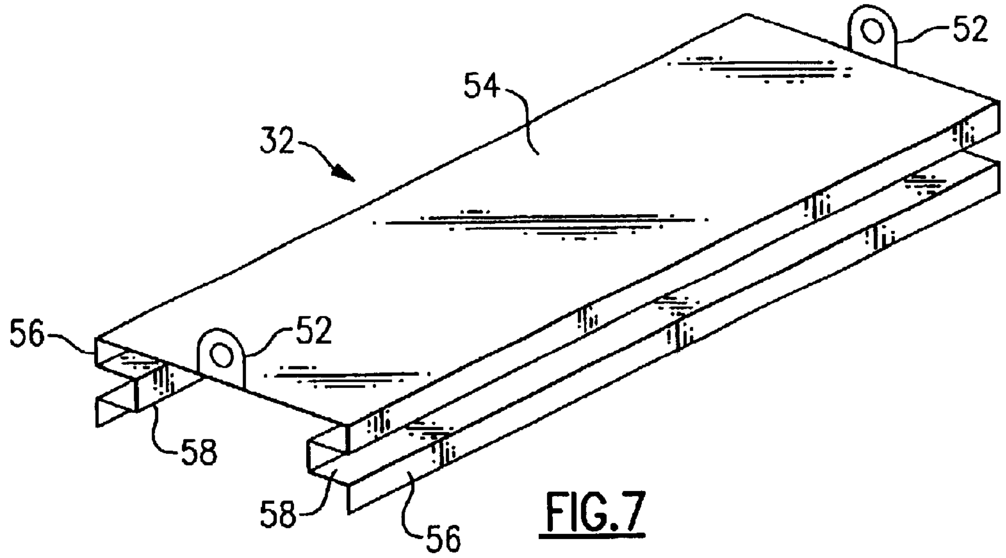
FIG. 7 is a perspective view of one of the bin carriers of this embodiment.
Figure 8:
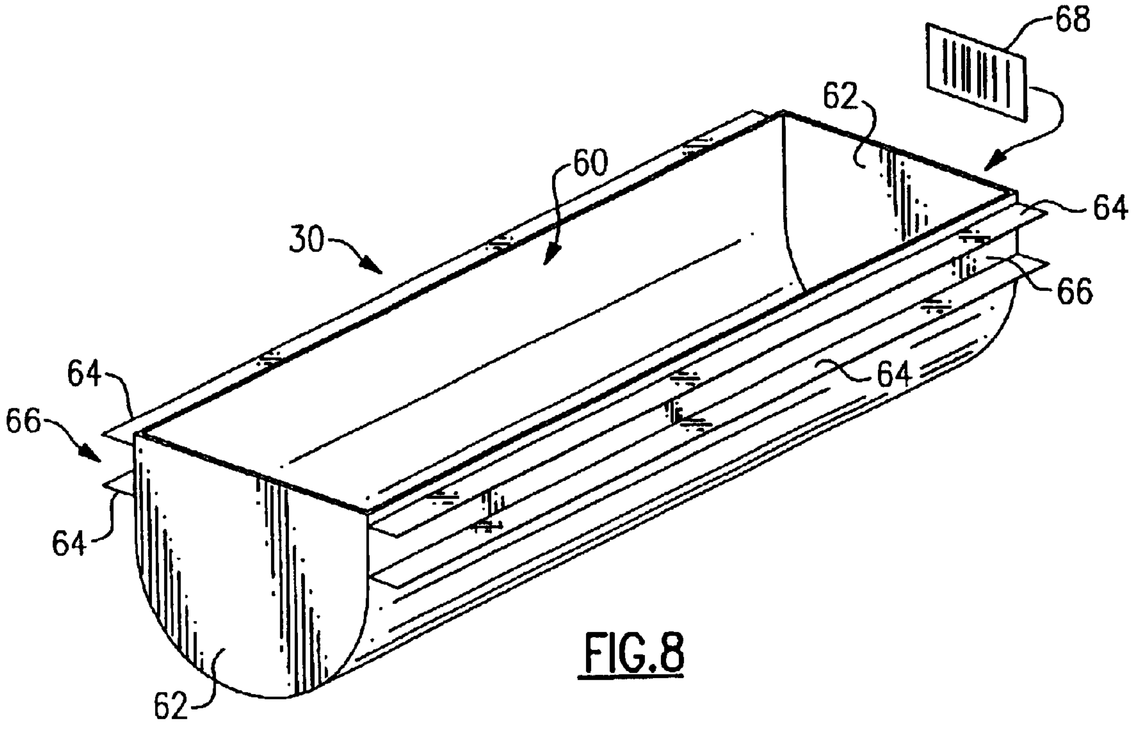
FIG. 8 shows one of the removable medication bins of this embodiment.

Details of the bin 30 and carrier or hanger 32 are shown in FIGS. 7 and 8. The bin hanger 32 has upstanding ears or trunnions 52 centered at its proximal and distal ends (i.e., front and rear ends) and these are respectively coupled by pins (not shown) to the front and rear drive chains 38. An upper flat panel 54 extends from one ear to the other, and there are left and right side walls 56 that depend from the sides of the panel 54. Each of the side walls has an elongated horizontal ridge or flange 58 that is inwardly directed so that the two flanges 58 are parallel and protrude towards one another. There can be a back vertical wall 59 at the distal end of the hanger or carrier 32 extending between the two side walls 56.

The bin 30 is an elongated concave member having a curved body 60 with an open top and flat vertical end walls 62. There are paired horizontal flanges 64 extending in the proximal-distal direction along each side of body 60, with one of the flanges being spaced above the other. The two flanges 64 along each side of the body 60 define a channel 66 that fits slidably onto an associated one of the flanges 58 of the hanger or carrier 32, so that the drawer bin 30 can be kept suspended in position along the serpentine pathway when the bin is inside the enclosure 12.

As also shown in FIG. 8, a bar coded label 68 is applied onto the rear or distal wall 62 of the bin 30. This label 68 can be applied adhesively or by another suitable technique. Preferably the label 68 is imprinted with a two-dimensional bar code or similar high-density code so that it will carry the date and time; patient identification and location, i.e., name, treating physician, bed and room, plus floor or station; and will also identify each of the items in the bin. Instead of a optical symbol, a magnetic code or other machine readable code can be used.

Figure 3:
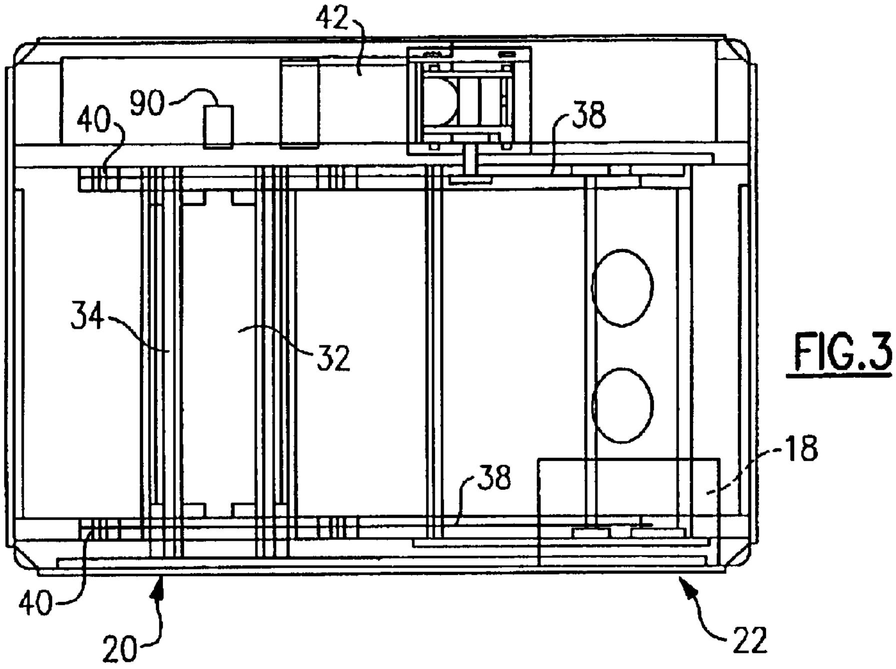
FIG. 3 is a top plan view of this embodiment, showing internal features thereof.
Figure 4:
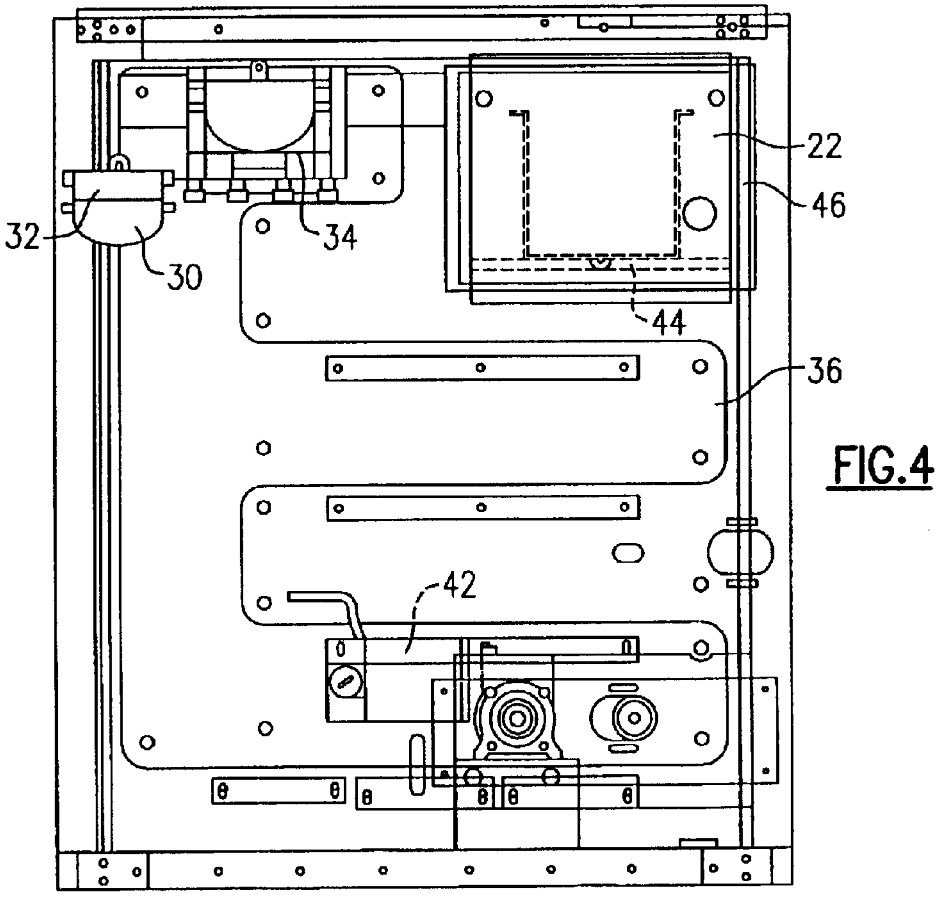
FIG. 4 is a front elevation of this embodiment, showing its interior workings.
Figure 5:
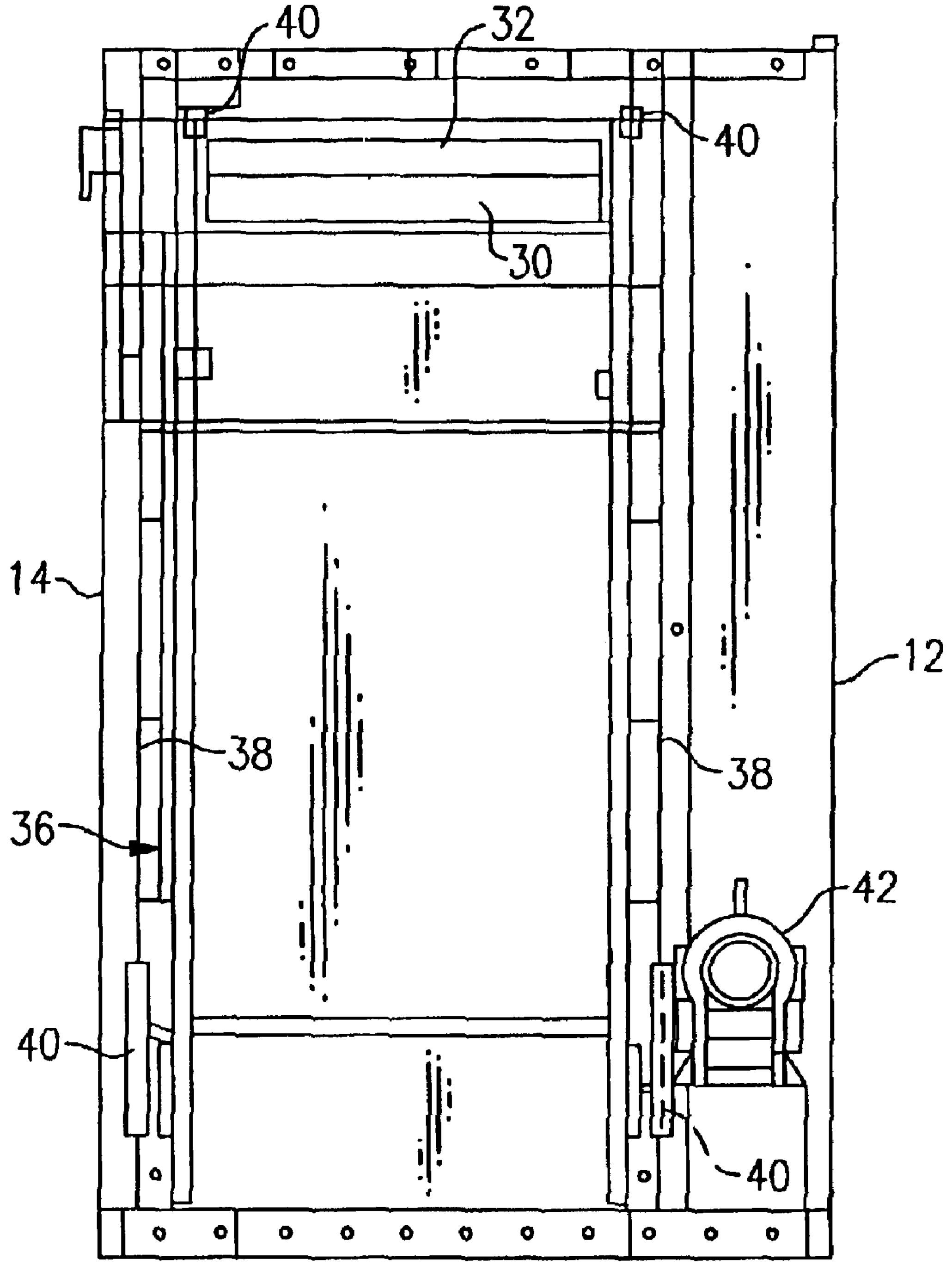
FIG. 5 is a side elevation of this embodiment.
Figure 6:
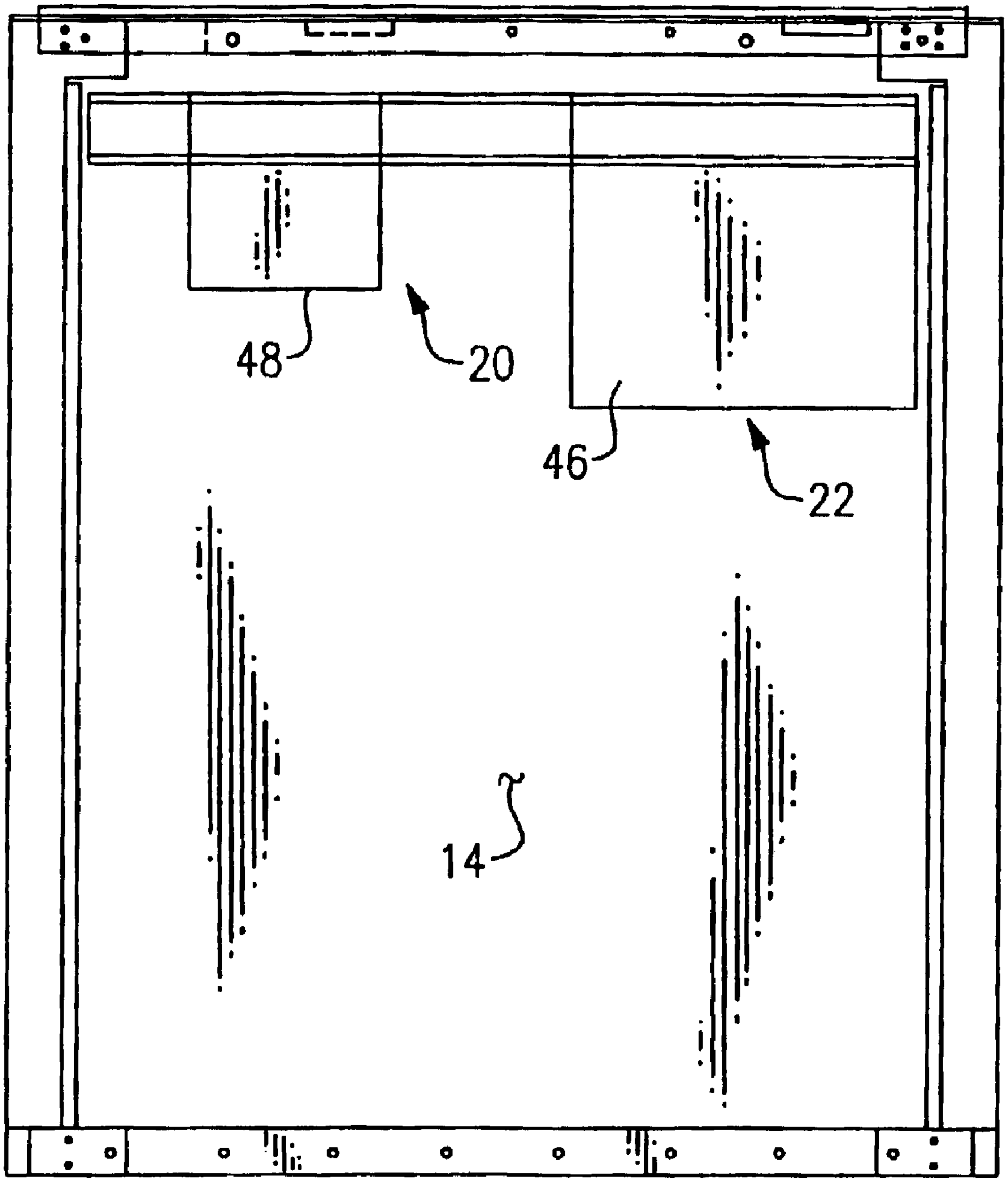
FIG. 6 is a front elevation showing positions of the removable bin drawer and the fixed bin drawer of this embodiment.

A scanner or reader 90 which is capable or scanning the bar coded symbol on the label 68 is positioned inside the cabinet or enclosure behind the distal end of the bin 30 and carrier 32 when at the drawer position, i.e., at the position illustrated in FIGS. 3 and 5. The scanner can also be used to read bar codes from the individual medications themselves, or an auxiliary scanner can be included for this purpose.

The drawer 20 is arranged so as to push the bin 30 out forward from the carrier 32 when the drawer 20 is pulled out, and to push the bin 30 into the proper position on he carrier 32 when the drawer is pushed back to its closed position. The bin is positioned so that it will not collide with any of the internal workings of the cart when the bin proceeds around the serpentine pathway 36. This means that the parts of the drawer 20 that push against the end walls 62 of the bin have to move out of the way to provide clearance for the bins to pass through the drawer location.

Figure 9:
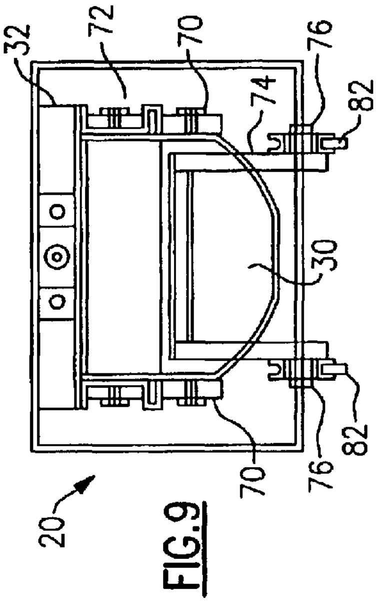
FIG. 9 is a front view of the pull-out bin drawer of this embodiment.
Figure 10:
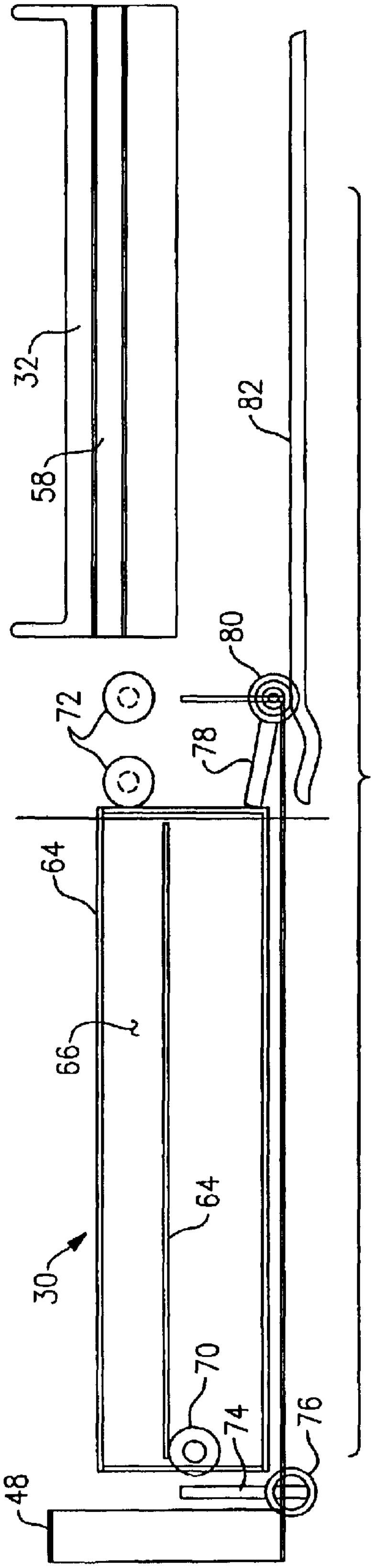
FIG. 10 is a side view of the bin drawer showing the slide, pusher arms, cams, and cam track of this embodiment.

As illustrated in FIGS. 9 and 10, and with further reference to the more detailed views of FIGS. 11A to 11E and FIGS. 12A to 12E, the bin drawer 20 is shown with the lockable front panel 48 and drawer slide 34. There is at least one roller or set of rollers 70 positioned on the slide and onto which the bin flanges 64 are received, and another roller or set of rollers 72 in a fixed position in the drawer 20. These rollers 72 arc received under the flange 64 or into the space or channel 66 between the flanges 64 on each side of the bin, and allow the bin 30 to be pulled off from the carrier 32 when the drawer slide 34 moves forward.

A front or proximal arm arrangement 74 is located near the front panel 48, and is pivotally mounted on the drawer slide 34. A cam roller 76 is mounted on this arm arrangement 74 for rotating the same. A rear or distal arm arrangement 78 is situated at the distal end of the slide 34 and has a cam roller 80 associated with it. Beneath the drawer slide there is a cam track 82 on which the cam rollers 76 and 80 ride, and which governs the angular positions of the respective arm arrangements 74 and 78. As shown in FIG. 9, the arm arrangements 74, 78 can comprise a pair of arms, with a pair of cam rollers, and with the cam track 82 comprising a pair of parallel rails.

The operation of the drawer 20 is as illustrated in FIGS. 11A to 11E. When the user has entered the required patient data and conveyor has brought the proper bin 30 to the drawer 20, the on-board processor unlocks the door panel 48, so that the user can pull out the drawer. Initially, as shown in FIG. 11A, the proximal and distal cam arms 74 and 78 are out of contact with the bin 30. When the user begins to open the drawer (FIG. 11B) the distal cam roller 80 contacts the track 82 and this rotates the arm 78 forward. As the user continues to open the drawer, the cam roller rides up onto the track 82, and this progressively rotates the arm 78 through an intermediate to a fully deflected position, as shown in FIGS. 11C and 11D. At the same time, the proximal cam roller 76 rocks the front or proximal arm up from a deflected position to a more or less vertical position (FIG. 11D). Then the user continues to pull the drawer 20 open, and the rear arm 78 pushes against the back wall of the bin 30 to push it clear of the associated carrier. In the full open position (FIG. 11E) the bin 30 can be lifted out from the drawer slide, and carried to the patient's bed for administration of the patient's medication.

Figure 12A:
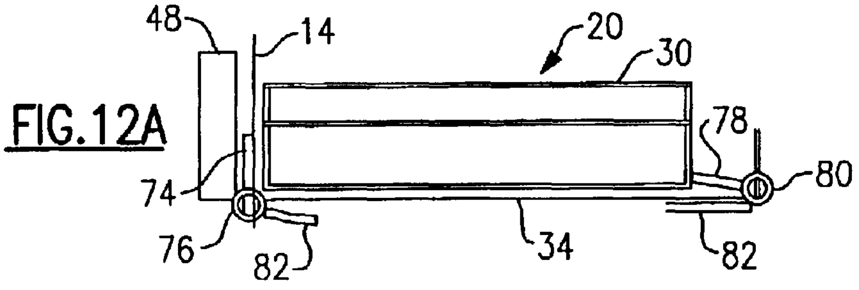
FIGS. 12A to 12E show the action of the front pusher arm of this embodiment.
Figure 12B:
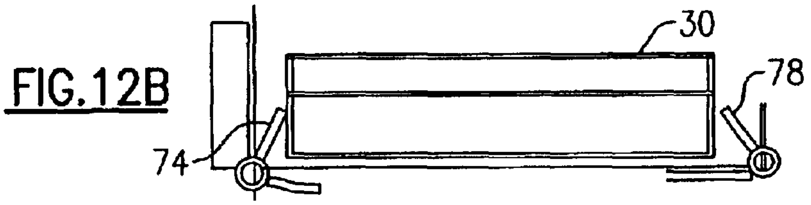
Figure 12C:
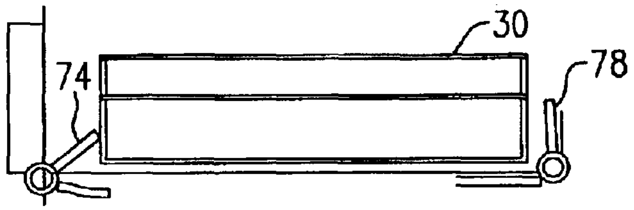
Figure 12D:
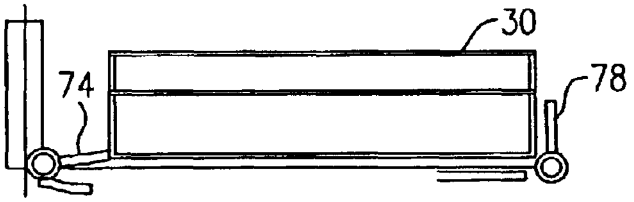
Figure 12E:
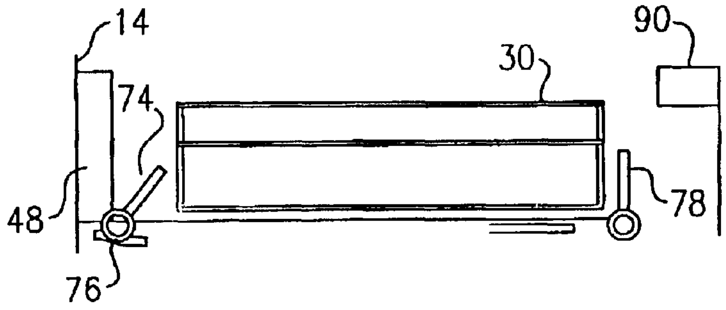

To close the drawer, the bin 30 is replaced to the position illustrated in FIG. 11E, and the drawer is pushed in towards a closed position. When the drawer begins to close, as illustrated in FIG. 12A, the front cam roller 76 comes into contact with the track 82, and the rear cam roller 80 comes to the end of the cam track 82. Then as the drawer is closed further, as shown in FIG. 12B, the front or proximal arm 74 begins to rock down to push against the bin 30, and the rear arm 80 begins to rock upward out of engagement with the back wall of the bin. As the user continues to push the drawer closed, as shown in FIGS. 12C and 12D, the cam track 82 acts on the respective cam rollers 76 and 80 to rock the arm 74 further back and to rock the arm 80 out of engagement with the bin 30. Then when the drawer is pushed to a fully closed position (FIG. 12E) with the panel 48 flush with the front panel 14 of the cart, the curvature at the front of the track 82 causes the proximal cam roller 76 to rock the associated arm 74 upward to back it away from engagement with the bin 30.

In other words, when the drawer 20 is opened, the rear arm 78 acts as a pusher to move the bin to the front of the drawer slide when the drawer is opened, and at that time the front arm 74 is moved out of the way of the bin. Then when the drawer is closed, the front arm 74 serves as a pusher to move the drawer bin into the proper position on the associated hanger or carrier 32. Then the arms 74 and 78 both move out of the way so that the bins 30 do not collide with them when the conveyor moves the bins along the conveyor pathway 36.

In this embodiment, the cart has an overall height, width (left to right), and depth (front to back) that provides a relatively small footprint so that the cart 10 occupies a minimum of hospital floor space. The drawers 20 and 22 are situated at a height of about 36 inches to 48 inches above the floor, which is a convenient height for doctors, nurses, attendants, or other customers.

Within the cabinet 12, an associated microprocessor-based controller board can be provided with the necessary modules to connect with and control the touch screen 18, any card or badge reader, motor drives, and scanner 90. The internal on-board processor may also have network modules, e.g., Ethernet circuitry, to connect with the hospital pharmacy computer network, either directly or via a modem.

While not shown here, a pharmacy cart may be pre-loaded with all the required patient medication bins 30 for a given floor or other area of nursing responsibility, so the pre-loaded bins can be brought to the given hospital floor and loaded into the medication cart 10. Each of the bins will have the appropriate bar coded label 68 affixed onto it. The pre-loaded bins can be taken off the pharmacy cart and loaded into the medication dispensing cart 10. The reader or scanner 90 will gather the data for each bin 30 when the bin is inserted into the cart 10, so that all the patient and medication information is automatically transferred to the cart's on-board processor. The pharmacy cart can be of a straightforward design, with separate slides or doors for each of the bins. There is less need for accountability as the bins are in the custody of the pharmacy staff until they have been loaded into the cart 10. The empty bins 30 that the pre-loaded ones replace can then simply be returned to pharmacy.

In some applications, the cart can be set up at a permanent, installed position, while in other applications, the casters would be used to permit the cart to be moved about within the hospital.

Figure 13:
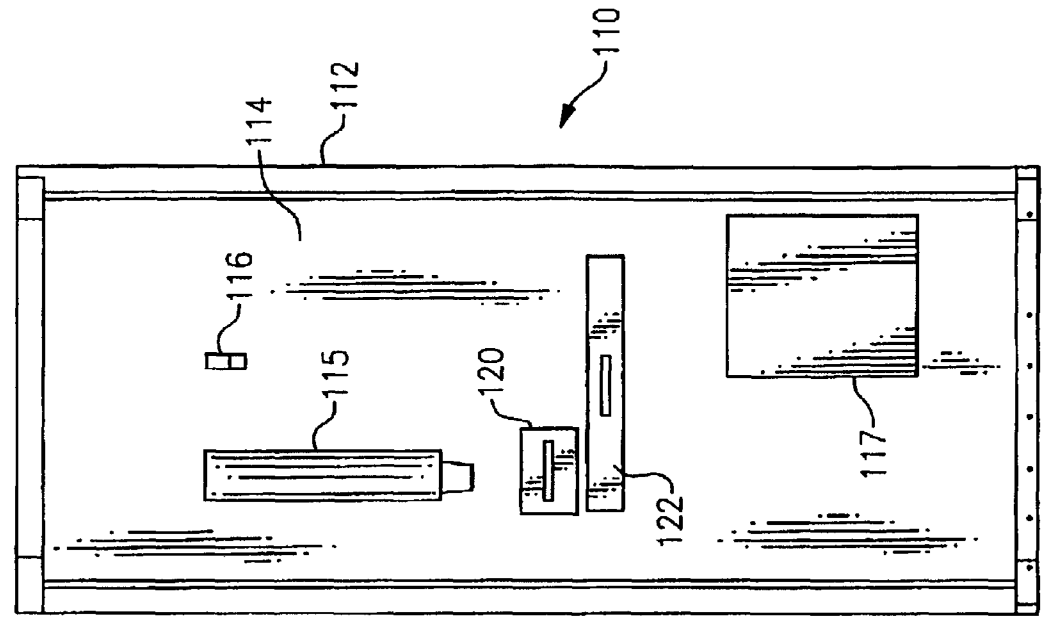
FIGS. 13 and 14 are a front elevation and a front sectional view of a medication cart of a second embodiment of this invention.
Figure 14:
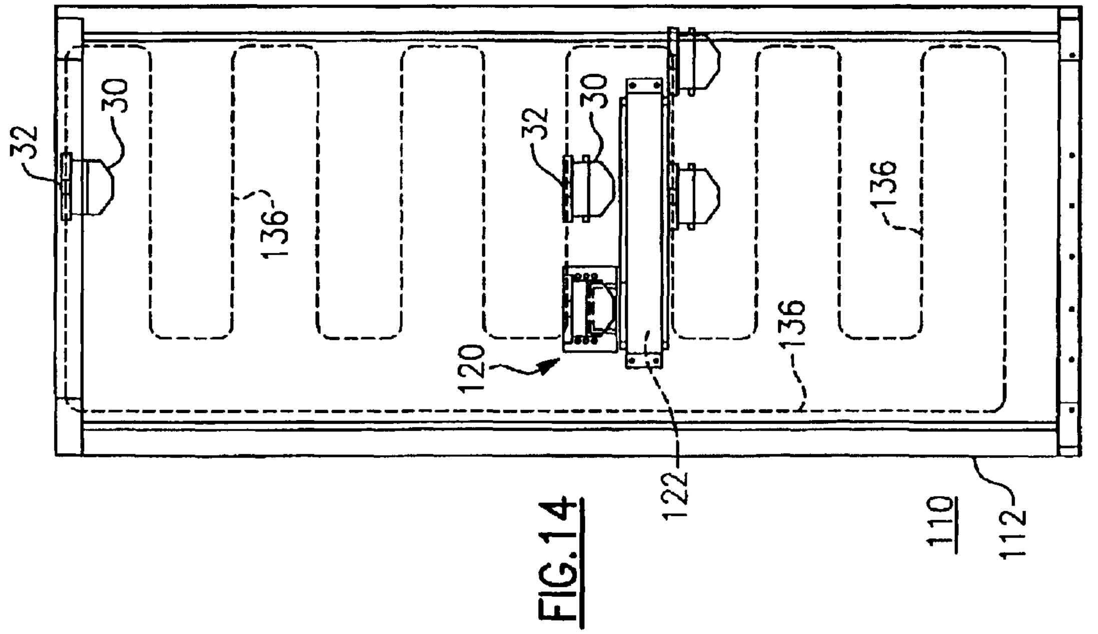

An alternative embodiment of this invention is illustrated in FIGS. 13 and 14. Here, the general concept is identical with the embodiment of FIG. 1, including a serpentine conveyor on which there are a number of carriers of holders 32, each carrying a removable bin 30. As shown in FIG. 13, the cart 110 of this embodiment has a cabinet or enclosure 112 that is about eighty to eighty-four inches in height from its bottom or base end to its top. As illustrated, the enclosure has a front panel 114, on which is mounted a dispenser 115 for disposable drinking cups, a socket or mount 116 for supporting an IV pole (not shown), and a waste receptacle 117. A drawer 120 for accessing the removable medication bins 30 is positioned at about three feet above the base, so that it is a convenient height for the nurses and other attendants. This drawer, and the internal mechanisms for bringing out the bins, can be identical with the drawer 20 of the first embodiment, and need not be described in detail here. Just beneath the location of the drawer 120 is a pull-out shelf or worktable 122, which provides a surface for the nurse, pharmacist, or attendant to annotate patient records, or to place drink cups, pill bottles or the like when medication is to be administered. While not shown specifically here, a touch screen display or similar user interface device can be mounted on the front panel 114 or on one of the sides of the enclosure, and would function in a manner similar to that described in connection with the first embodiment.

As shown in FIG. 14, a serpentine, folded conveyor system 136 can carry, e.g., ninety carriers or holders 32 and a corresponding ninety removable bins 30. The serpentine pathway of the conveyor system 136 extends from the base to the top of the enclosure, past the location of the drawer 120. (Only a few of the bins and carriers are illustrated here, to avoid drawing clutter.)

Other possible configurations are also possible, i.e., higher or wider than the embodiments described here, or having additional drawer(s).

While the invention has been described in terms of a hospital medicine dispensing cart arrangement, a cabinet or similar unit incorporating the principles of this invention could be used for other dispensed items in which the access and administration had to be closely controlled or where accountability of access was necessary.

While the invention has been described hereinabove with reference to selected preferred embodiments, it should be recognized that the invention is not limited to those precise embodiments. Rather, many modification and variations would present themselves to persons skilled in the art without departing from the scope and spirit of this invention, as defined in the appended claims.

I claim:

1. An automated medication dispensing cart, comprising an enclosure having a top surface and a front wall; said front wall having an opening at a drawer position thereon; an on-board processor including display means and user access means permitting a user to enter information for access to a patient's medication contained within the dispensing cart; a plurality of elongated medication bins; internal conveyor means within said enclosure supporting said plurality of bins and moving said bins under control of said processor along a predetermined pathway inside said enclosure, the pathway including a position aligned with said drawer position; a drawer located at said drawer position including a slide member engaging a respective one of said bins when located at said drawer position and permitting said bin to be pulled out from said conveyor means and to be pushed in to return the bin to the conveyor means; and said internal conveyor means including a plurality of bin carriers that move along said pathway, and having structure slidably mating with corresponding structure on said bins for supporting the bins as they travel along said pathway but permitting the bins to slide out from the respective bin carriers when at said drawer position.

2. The automated medication dispensing cart according to claim 1, wherein each of said bins includes a coded symbol thereon containing data representing the contents of the bin and associated patient identification information, and said cart includes a reader device at said drawer position for reading said coded symbol and transferring said data for each respective bin to said processor.

3. The automated medication dispensing cart according to claim 1, wherein said coded symbol includes a 2-D bar code symbol.

4. The automated medication dispensing cart according to claim 1, wherein each said carrier has a pair of elongated flanges horizontal facing one another, and each said bin has a pair of elongated channels on opposite sides thereof, said channels slidably mating with said flanges.

5. The automated medication dispensing cart according to claim 1, wherein said pathway is a closed serpentine loop.

6. The automated medication dispensing cart according to claim 5, wherein said conveyor means includes a drive web traveling in said closed loop and onto which said carriers are affixed, and a gear drive motor drive for driving said drive web.

7. The automated medication dispensing cart according to claim 6, wherein said gear motor drive includes a 90-degree gear motor disposed at a back wall of said enclosure.

8. The automated medication dispensing cart according to claim 5, further comprising an auxiliary drawer disposed at an auxiliary drawer position in said enclosure, and containing an auxiliary bin that does not travel along said pathway; said serpentine pathway being adapted to bypass said auxiliary drawer position.

9. The automated medication dispensing cart according to claim 1, wherein said drawer slide includes a rear arm at a distal portion of the slide behind said the position of the carrier and rotatable to contact and push an associated bin forward when the drawer is pulled out; and a front arm disposed at a proximal portion of the slide in advance of said carrier and rotatable to contact and push the associated bin rearward when the drawer is pushed in; both the rear and front arms being rocked out of contact with the associated bin when the drawer is in a fully closed position.

10. The automated medication dispensing cart according to claim 9, further comprising front and rear cams operatively coupled to said front and rear arms, respectively for rotating the same, and a cam track affixed in said enclosure at said drawer position on which said first and second cams respectively ride when the drawer is pulled out and pushed in.

11. The automated medication dispensing cart according to claim 1, wherein said drawer position is located immediately beneath said top surface of said cart.

12. An automated medication dispensing cart, comprising an enclosure having a front wall having a base end and a top end; said front wall having an opening at a drawer position thereon; an on-board processor including user access means permitting a user to enter information for access to medication contained within the dispensing cart; a plurality of elongated medication bins; internal conveyor means within said enclosure supporting said plurality of bins and moving said bins under control of said processor along a predetermined pathway inside said enclosure, the pathway including a position aligned with said drawer position; a drawer located at said drawer position including a slide member engaging a respective one of said bins when located at said drawer position and permitting said bin to be pulled out from said conveyor means and to be pushed in to return the bin to the conveyor means; and said internal conveyor means including a plurality of bin carriers that move along said pathway, and having structure slidably mating with corresponding structure on said bins for supporting the bins as they travel along said pathway but permitting the bins to slide out from the respective bin carriers when at said drawer position.

13. The automated medication dispensing cart according to claim 12, wherein said drawer position is about three feet above said base end.

14. The automated medication dispensing cart according to claim 12, wherein said top end is about seven feet above said base end.

15. The automated medication dispensing cart according to claim 12 further comprising a pull-out shelf adjacent said drawer position.

16. The automated medication dispensing cart according to claim 12, wherein said pathway is a closed serpentine loop that extends above and below said drawer position.

17. The automated medication dispensing cart according to claim 16, wherein said conveyor means includes a drive web traveling in said serpentine loop and onto which said carriers arc affixed, and a motor drive for driving said drive web.

18. The automated medication dispensing cart according to claim 1, wherein said bins are configured to be removable from said drawer when in said drawer position.

* * * * *